(12) United States Patent
Matsuoka

(10) Patent No.: US 10,006,194 B2
(45) Date of Patent: Jun. 26, 2018

(54) VARIABLE SHAPE FRAME USING EXTENDABLE ARM

(71) Applicant: FUJIMIYASEISAKUSHO CO., LTD., Kumamoto (JP)

(72) Inventor: Norimichi Matsuoka, Kumamoto (JP)

(73) Assignee: FUJIMIYASEISAKUSHO CO., LTD., Kumamoto (JP)

( * ) Notice: Subject to any disclaimer, the term of this patent is extended or adjusted under 35 U.S.C. 154(b) by 0 days. days.

(21) Appl. No.: 15/429,308

(22) Filed: Feb. 10, 2017

(65) Prior Publication Data

US 2018/0051458 A1 Feb. 22, 2018

(30) Foreign Application Priority Data

Aug. 22, 2016 (JP) ................. 2016-161979

(51) Int. Cl.
| | |
|---|---|
| *E04H 12/18* | (2006.01) |
| *E04B 1/343* | (2006.01) |
| *E04B 1/32* | (2006.01) |
| *E04B 1/344* | (2006.01) |
| *A63H 33/00* | (2006.01) |

(Continued)

(52) U.S. Cl.
CPC ......... *E04B 1/34357* (2013.01); *A63H 33/00* (2013.01); *E04B 1/32* (2013.01); *E04B 1/344* (2013.01); *E04H 15/50* (2013.01); *F16S 3/08* (2013.01)

(58) Field of Classification Search
CPC ........ E04B 1/34357; E04B 1/344; E04B 1/32; E04B 1/3441; E04B 2001/3241; E04B 1/19; E04H 15/50; B66F 11/042
See application file for complete search history.

(56) References Cited

U.S. PATENT DOCUMENTS

| | | | | |
|---|---|---|---|---|
| 3,888,056 A | * | 6/1975 | Kelly ...................... | E04B 1/32 135/145 |
| RE31,565 E | * | 4/1984 | Beaulieu ................. | E04H 15/50 135/145 |

(Continued)

FOREIGN PATENT DOCUMENTS

| | | |
|---|---|---|
| CN | 102172840 A | 9/2011 |
| JP | S53-007912 A | 1/1978 |

(Continued)

*Primary Examiner* — Brian D Mattei
(74) *Attorney, Agent, or Firm* — Hauptman Ham, LLP

(57) ABSTRACT

A variable shape frame includes: a plurality of extendable arms to form a frame; and a coupling mechanism that couples ends of adjoining extendable arms. Each extendable arm includes cross units having by two rigid members crossing in an X-shape and pivotally coupled by a middle coupling shaft, and an end coupling portion pivotally coupling ends of adjoining cross units. The end coupling portion includes inner and outer end coupling shafts. Each rigid member has a curved shape. The coupling mechanism includes first bent members each pivotally coupling the inner end coupling shaft of one extendable arm and the outer end coupling shaft of the other extendable arm, second bent members each pivotally coupling the outer end coupling shaft of the one extendable arm and the inner end coupling shaft of the other extendable arm, and bent portion coupling shafts each pivotally coupling the first and second bent members.

6 Claims, 15 Drawing Sheets

(51) Int. Cl.
*E04H 15/50* (2006.01)
*F16S 3/08* (2006.01)

(56) References Cited

U.S. PATENT DOCUMENTS

| | | | |
|---|---|---|---|
| 7,712,261 B2* | 5/2010 | Zeigler | E04H 15/50 135/128 |
| 2002/0083675 A1* | 7/2002 | Hoberman | A63F 9/088 52/645 |
| 2002/0112413 A1* | 8/2002 | Hoberman | E04B 1/3211 52/71 |
| 2004/0144413 A1 | 7/2004 | Matthews et al. | |
| 2009/0158674 A1* | 6/2009 | Guerrero | E04B 1/344 52/81.2 |
| 2011/0252717 A1* | 10/2011 | Graf Fernandez | E01D 15/127 52/71 |
| 2015/0300560 A1 | 10/2015 | Matsuoka | |

FOREIGN PATENT DOCUMENTS

| | | |
|---|---|---|
| JP | S60-179598 U | 11/1985 |
| JP | 2008-308940 A | 12/2008 |
| JP | 2014159070 A | 9/2014 |
| JP | 2016211617 A | 12/2016 |
| WO | 02/063111 A1 | 8/2002 |

* cited by examiner

VARIABLE SHAPE FRAME USING EXTENDABLE ARM

BACKGROUND OF THE INVENTION

Field of the Invention

The present invention relates to variable shape frame whose shape can be changed according to an extending/contracting operation of an extendable arm.

Background Art

The applicant of the present application proposed in Japanese Unexamined Patent Application Publication No. 2014-159070 an extendable arm that extends and contracts in a curved path. This extendable arm is formed by a plurality of cross units connected in a linear fashion, and each cross unit is formed by two rigid members crossing each other in an X-shape.

SUMMARY OF INVENTION

The inventors of the present application considered more effective use of such an extendable arm and found that a two-dimensional shape and a three-dimensional shape can be changed by using the extendable arm.

It is an object of the present invention to provide a variable shape frame whose shape can be changed according to an extending/contracting operation of an extendable arm.

A variable shape frame according to the present invention includes: a plurality of extendable arms arranged to form a frame; and a coupling mechanism that couples ends of adjoining ones of the extendable arms so that the adjoining extendable arms can move together. Each of the extendable arms includes a plurality of cross units each formed by two rigid members crossing each other in an X-shape and pivotally coupled by a middle coupling shaft, and an end coupling portion pivotally coupling ends of adjoining ones of the cross units. The end coupling portion includes inner end coupling shafts located on an inner side, and outer end coupling shafts located on an outer side. Each of the rigid members has a curved shape so that the extendable arm extends and contracts along a curved track. The coupling mechanism includes first bent members each pivotally coupling the inner end coupling shaft of one of adjoining two of the extendable arms and the outer end coupling shaft of the other extendable arm, second bent members each pivotally coupling the outer end coupling shaft of the one of adjoining two of the extendable arms and the inner end coupling shaft of the other extendable arm, and bent portion coupling shafts each pivotally coupling the first bent member and the second bent member at an intersection of the first and second bent members.

In one embodiment of the present invention, each of the rigid members has a shape curved in a lateral direction thereof, and each of the extendable arms has a curved shape that is convex toward outside of the frame on a same plane when in an extended state. In this embodiment, the first and second bent members operate on the same plane.

In another embodiment of the present invention, each of the rigid members has a shape curved in a lateral direction thereof, and each of the extendable arms has a curved shape that is concave toward inside of the frame on a same plane when in an extended state. In this embodiment, the first and second bent members operate on the same plane.

In still another embodiment of the present invention, the first and second bent members operate on a same plane. In this embodiment, each of the rigid members has a shape curved in a thickness direction thereof, and each of the extendable arms has a shape curved on a plane crossing the same plane when in an extended state.

In yet another embodiment of the present invention, the first and second bent members operate on a same plane. In this embodiment, each of the rigid members has a shape curved in a lateral direction thereof, and each of the extendable arms has a shape curved on a plane crossing the same plane when in an extended state.

In a further embodiment of the present invention, a variable shape frame includes: a plurality of extendable arms arranged to form a frame; and a coupling mechanism that couples ends of adjoining ones of the extendable arms so that the adjoining extendable arms can move together. Each of the extendable arms includes a plurality of cross units each formed by two rigid members crossing each other in an X-shape and pivotally coupled by a middle coupling shaft, and an end coupling portion pivotally coupling ends of adjoining ones of the cross units. The end coupling portion includes inner end coupling shafts located on an inner side, and outer end coupling shafts located on an outer side. The extendable arms include a curved extendable arm that extends and contracts along a curved track and a linear extendable arm that extends and contracts along a linear track. The coupling mechanism includes first bent members each pivotally coupling the inner end coupling shaft of one of adjoining two of the extendable arms and the outer end coupling shaft of the other extendable arm, second bent members each pivotally coupling the outer end coupling shaft of the one of adjoining two of the extendable arms and the inner end coupling shaft of the other extendable arm, and bent portion coupling shafts each pivotally coupling the first bent member and the second bent member at an intersection of the first and second bent members.

According to the invention having the above configuration, the shape of the frame can be changed according to an extending/contracting operation of the extendable arms.

DESCRIPTION OF EMBODIMENTS

Figure 1:
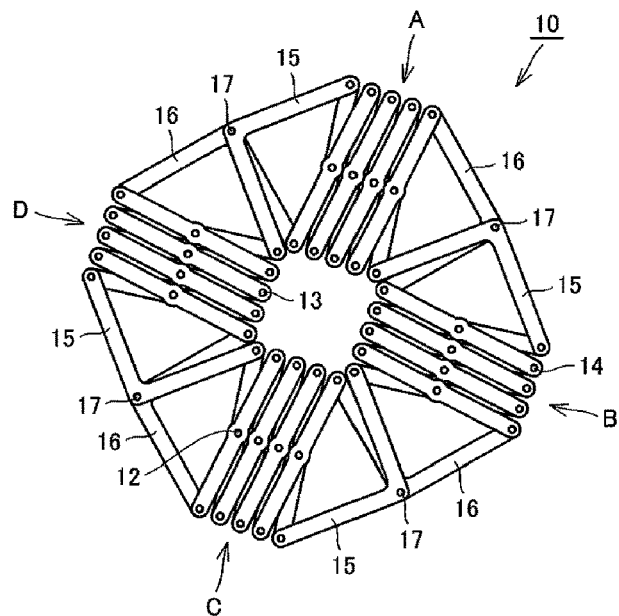
FIG. 1 is a plan view of a quadrilateral frame disclosed in Japanese Unexamined Patent Application Publication No. 2015-93299 previously filed by the inventors of the present application, showing the quadrilateral frame having the smallest area.
Figure 2:
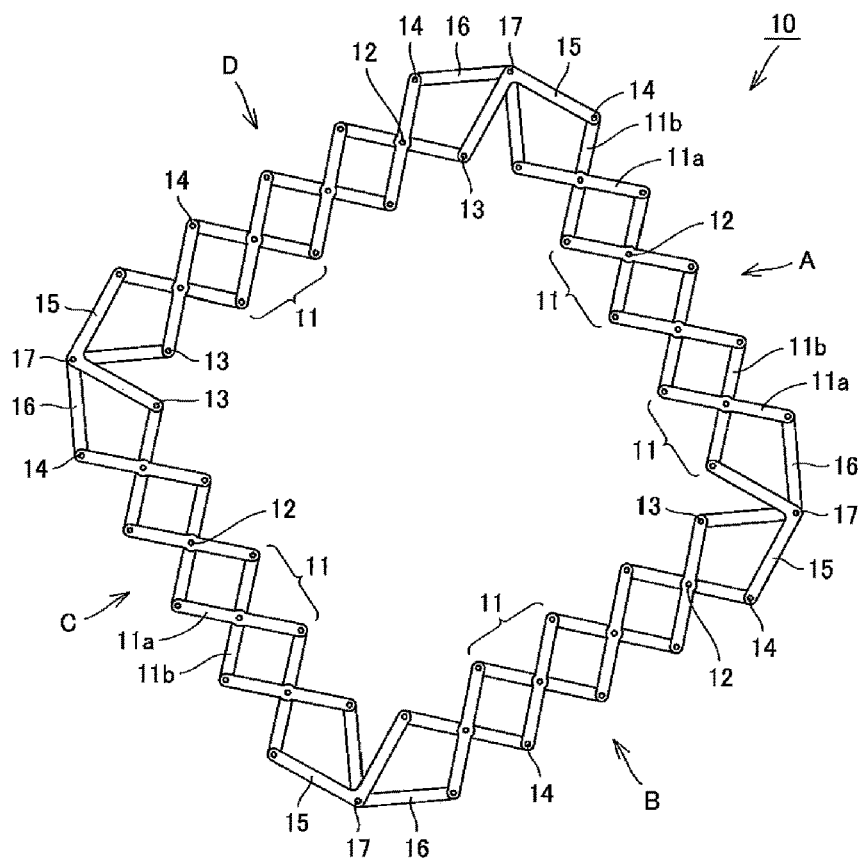
FIG. 2 is a plan view of the quadrilateral frame having an intermediate area.
Figure 3:
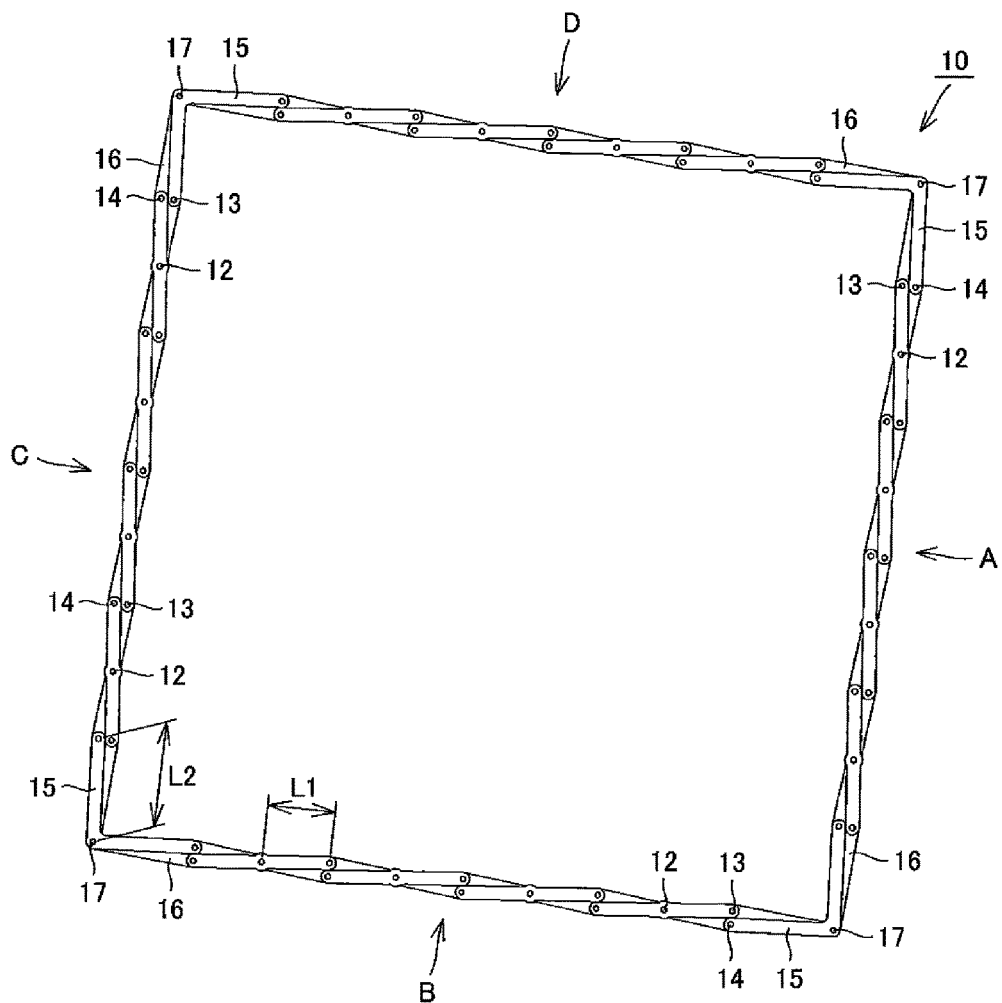
FIG. 3 is a plan view of the quadrilateral frame having the largest area.

Quadrilateral Frame as Reference Example Shown in FIGS. 1 to 3

FIGS. 1 to 3 shows a quadrilateral frame described in Japanese Patent Application No. 2015-93299 previously filed by the inventors of the present application. The quadrilateral frame shown in FIGS. 1 to 3 is not an embodiment of the present invention, but some of the elements included in this quadrilateral frame are the same as those included in embodiments of the present invention. In order to facilitate understanding of embodiments of the present invention described in detail below, the quadrilateral frame will first be described with reference to FIGS. 1 to 3.

FIG. 1 shows the quadrilateral frame having the smallest area, FIG. 2 shows the quadrilateral frame having an intermediate area, and FIG. 3 shows the quadrilateral frame having the largest area. The area herein refers to the area surrounded by the outline of the quadrilateral frame.

FIGS. 1 to 3 illustrate a quadrilateral variable area frame by way of example. However, the configuration and operation are basically the same even if the variable area frame has other polygonal shapes such as triangular, pentagonal, and hexagonal shapes.

The configuration of a quadrilateral frame 10 will be described mainly with reference to FIG. 2.

As shown in the figures, the four sides of the quadrilateral frame 10 are formed by four extendable arms A, B, C, D, and the length of each side changes according to the extending/contracting operation of the extendable arms A, B, C, D. The quadrilateral frame 10 includes a coupling mechanism that couples adjoining two of the extendable arms A, B, C, D so that these two extendable arms can move together. The coupling mechanism thus allows adjoining two of the four sides of the quadrilateral frame 10 to extend and contract together. The coupling mechanism will be described later.

Each extendable arm A, B, C, D includes a plurality of cross units 11 and an end coupling portion. Each cross unit 11 is formed by two rigid members 11a, 11b crossing each other in an X-shape and pivotally coupled by a middle coupling shaft 12. The end coupling portion pivotally couples the ends of adjoining ones of the cross units 11.

In the illustrated embodiment, the end coupling portion includes inner end coupling shafts 13 and outer end coupling shafts 14. The inner end coupling shafts 13 are located on the inner side of the quadrilateral frame 10, and the outer end coupling shafts 13 are located on the outer side of the quadrilateral frame 10. Regarding the shape of each rigid member as a component of the cross unit 11, an imaginary line connecting the inner end coupling shaft 13, the middle coupling shaft 12, and the outer end coupling shaft 14 is straight as viewed in top plan. The rigid member may have any shape as long as the imaginary line connecting these three coupling shafts is straight as viewed in plan. The rigid member may have a curved shape like an S-shape or a Z-shape as viewed in plan, or may have a shape curved in the thickness direction thereof like an arc shape.

The coupling mechanism that couples adjoining two of the extendable arms A, B, C, D so that these two extendable arms can move together includes a first bent member 15, a second bent member 16, and a corner coupling shaft 17 at each corner of the quadrilateral frame 10. The first and second bent members 15, 16 are members bent in a V-shape. Each corner coupling shaft 17 pivotally couples the first and second bent members 15, 16 at their intersection (the position of their bend points).

The first bent member 15 pivotally couples the inner end coupling shaft 13 of the extendable arm of one of adjoining two of the four sides of the quadrilateral frame 10 and the outer end coupling shaft 14 of the extendable arm of the other side. The second bent member 16 pivotally couples the outer end coupling shaft 14 of the extendable arm of the one of adjoining two of the four sides of the quadrilateral frame 10 and the inner end coupling shaft 13 of the extendable arm of the other side.

In order to increase or reduce the area of the frame 10 so that the frame 10 maintains a shape similar to its original polygonal shape, the first and second bent members 15, 16 need to have a predetermined bend angle. Specifically, the first and second bent members 15, 16 need to have a bend angle of A/n, where A represents the sum of interior angles of an n-gon. For example, in the case of a quadrilateral frame, the bend angle of each bent member is 90 degrees. In the case of an equilateral triangular frame, the bend angle of each bent member is 60 degrees. In the case of a regular pentagonal frame, the bend angle of each bent member is 108 degrees. In the case of a regular hexagonal frame, the bend angle of each bent member is 120 degrees.

The relationship in length between each rigid member 11a, 11b as a component of each cross unit 11 and each bent member 15, 16 will be described. The value of L2/L1 is about 1 to 2.16 for an equilateral triangular frame, about 1 to 1.5 for a quadrilateral frame, about 1 to 1.32 for a regular pentagonal frame, and about 1 to 1.23 for a regular hexagonal frame, where L1 represents the interval between the middle coupling shaft 12 and the inner end coupling shaft 13 and the interval between the middle coupling shaft 12 and the outer end coupling shaft 14 in each rigid member 11a, 11b, and L2 represents the interval between the corner coupling shaft 17 and the inner end coupling shaft 13 and the interval between the corner coupling shaft 17 and the outer end coupling shaft 14 in each bent member 15, 16 (see FIG.

3). The larger the value of L2/L1 is in the above range, the larger the degree to which the area of the frame changes is.

The extendable arm forming each side of the polygonal frame is formed by a plurality of cross units 11 connected linearly in a direction in which the extendable arm extends and contracts. In the case of a regular polygonal frame, each side of the frame is formed by the same integer number of cross units 11. The rigid members forming each cross unit 11 have the same length.

When the quadrilateral frame 10 has the smallest area as shown in FIG. 1, each cross unit 11 is in a collapsed state, and the extendable arms A, B, C, D have the smallest length.

When the quadrilateral frame 10 has an intermediate area as shown in FIG. 2, each cross unit 11 is opened such that the two rigid members 11a, 11b are substantially perpendicular to each other, and the extendable arms A, B, C, D have an intermediate length.

When the quadrilateral frame 10 has the largest area as shown in FIG. 3, each cross unit 11 is in a fully opened state, and the inner end coupling shafts 13 of the two rigid members 11a, 11b of each cross unit 11 are located close to the outer end coupling shafts 14 of the two rigid members 11a, 11b of each cross unit 11. In this state, the extendable arms A, B, C, D forming each side of the quadrilateral frame 10 have the largest length.

The operation of changing the area of the frame, namely the operation of extending and contracting the extendable arms, may be performed manually or may be performed by using drive means such as a motor.

Similarities and Differences Between Quadrilateral Frame for Reference Shown in FIGS. 1 to 3 and Embodiments of Present Invention Features common to embodiments of the present invention and the quadrilateral frame shown in FIGS. 1 to 3 are as follows.

(a) The frame includes extendable arms arranged to form a frame and a coupling mechanism that couples the ends of adjoining ones of the extendable arms.

(b) Each extendable arm includes a plurality of cross units and an end coupling portion. Each cross unit is formed by two rigid members crossing each other in an X-shape and pivotally coupled by a middle coupling shaft. The end coupling portion pivotally couples the ends of adjoining ones of the cross units.

(c) The end coupling portion includes inner end coupling shafts located on the inner side and outer end coupling shafts located on the outer side.

(d) The coupling mechanism includes first bent members each pivotally coupling the inner end coupling shaft of one of adjoining two of the extendable arms and the outer end coupling shaft of the other extendable arm.

(e) The coupling mechanism includes second bent members each pivotally coupling the outer end coupling shaft of the one of adjoining two extendable arms and the inner end coupling shaft of the other extendable arm.

(f) The coupling mechanism includes bent portion coupling shafts each pivotally coupling the first and second bent members at their intersection.

The embodiments of the present invention are different from the embodiment shown in FIGS. 1 to 3 in the following points.

(g) Each rigid member has a curved shape so that the extendable arm extends and contracts along a curved track.

(h) The coupling mechanism couples the ends of the extendable arms that extend and contract along a curved track so that the extendable arms can move together.

Figure 4:
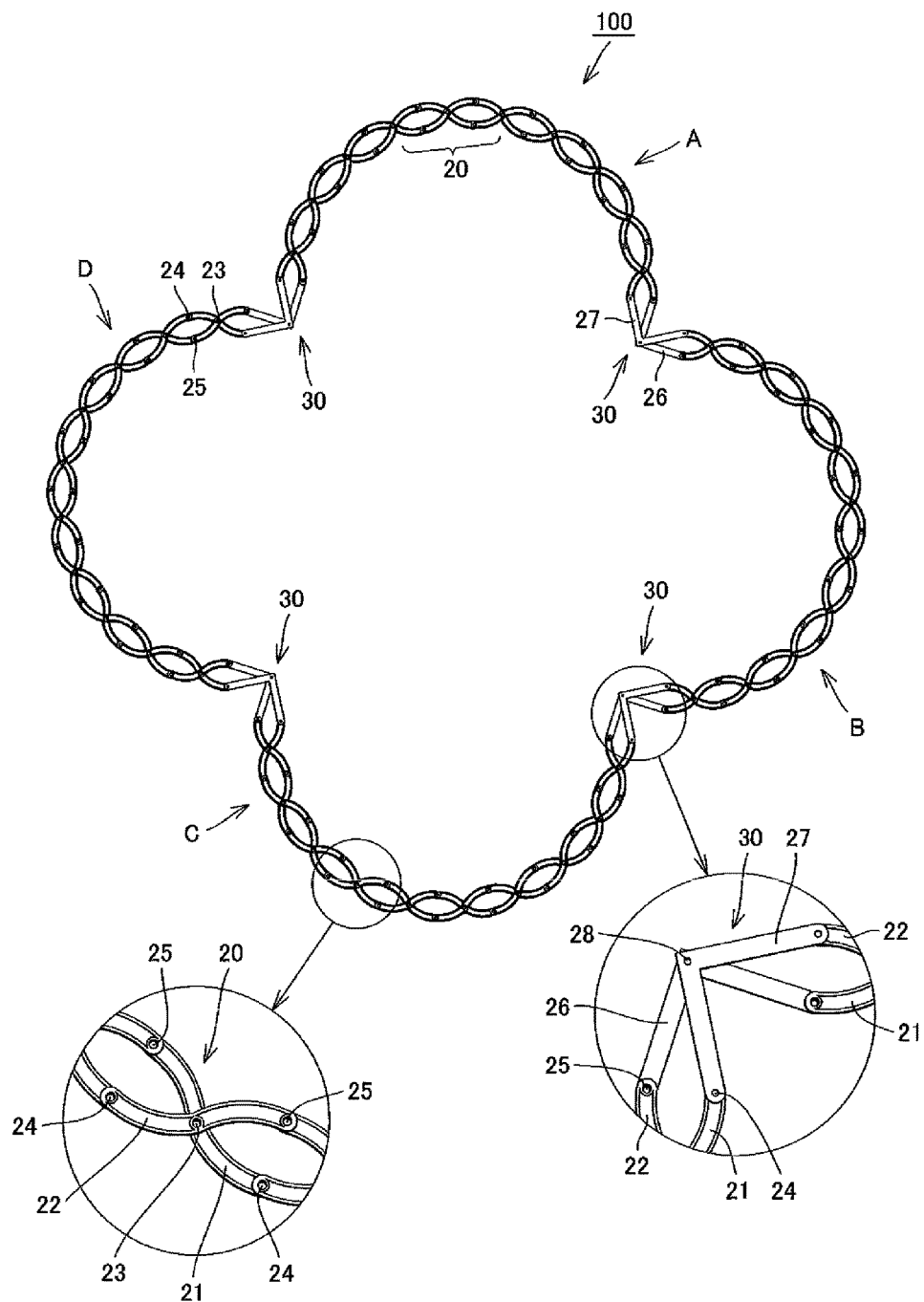
FIG. 4 is a plan view of a variable shape frame according to an embodiment of the present invention.
Figure 5:
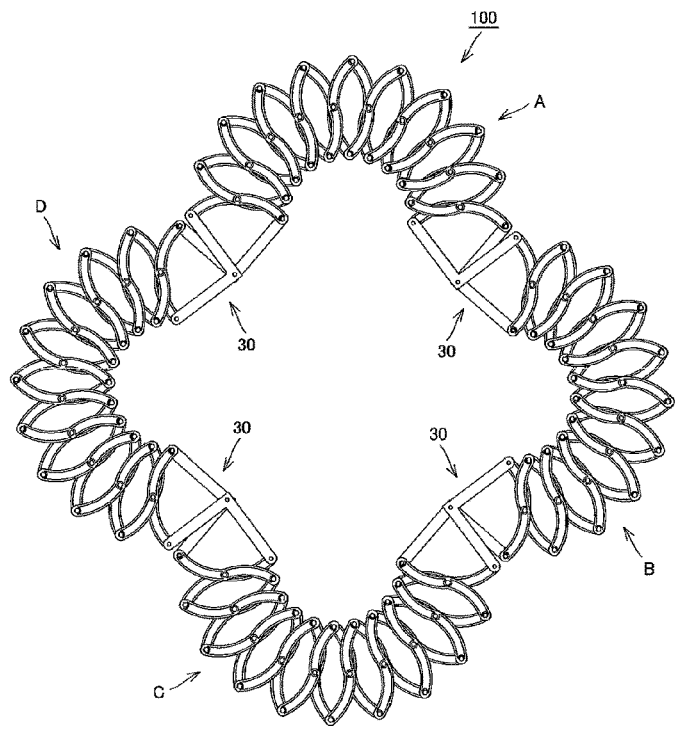
FIG. 5 is a plan view of the variable shape frame of FIG. 4 in a contracted state.
Figure 6:
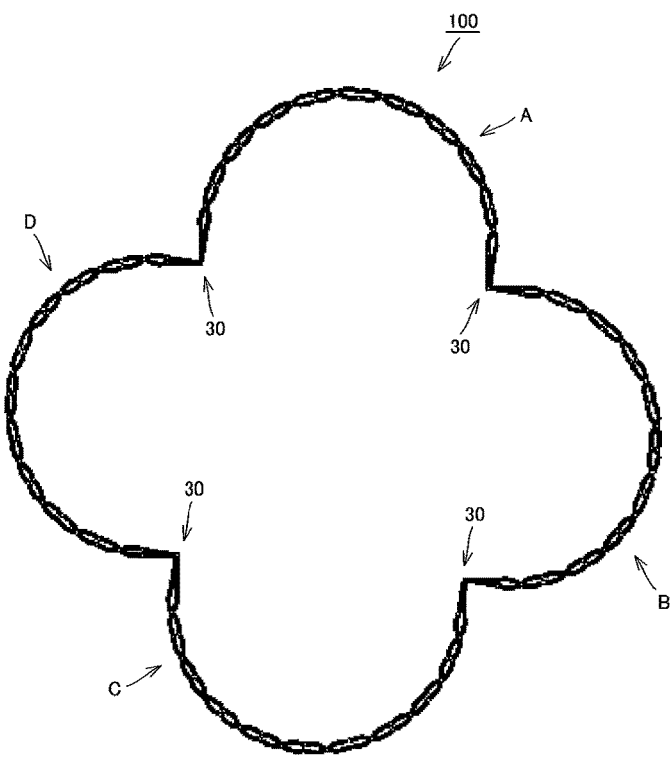
FIG. 6 is a plan view of the variable shape frame of FIG. 4 in an extended state.

Embodiment Shown in FIGS. 4 to 6

FIGS. 4 to 6 show a variable shape frame according to a first embodiment of the present invention. FIG. 4 shows the variable shape frame extended to an intermediate position, FIG. 5 shows the variable shape frame in a contracted state, and FIG. 6 shows the variable shape frame in an extended state.

A variable shape frame 100 shown in the figures includes four arc-shaped extendable arms A, B, C, D and a coupling mechanism 30. The four extendable arms A, B, C, D are arranged to form a closed frame, and the coupling mechanism 30 couples the ends of adjoining ones of the extendable arms A, B, C, D so that the adjoining extendable arms can move together. Each extendable arm A, B, C, D includes a plurality of cross units 20 and an end coupling portion. Each cross unit 20 is formed by two rigid members 21, 22 crossing each other in an X-shape and pivotally coupled by a middle coupling shaft 23. The end coupling portion pivotally couples the ends of adjoining ones of the cross units 20. The end coupling portion includes inner end coupling shafts 25 located on the inner side of the variable shape frame 100 and outer end coupling shafts 24 located on the outer side of the variable shape frame 100.

Each rigid member 21, 22 has a curved shape so that the extendable arm A, B, C, D extends and contracts along a curved track. Such a rigid member is described in Japanese Unexamined Patent Application Publication No. 2014-159070 filed by the applicant of the present application.

In the embodiment shown in FIGS. 4 to 6, each rigid member 21, 22 has a curved shape, namely a shape curved in the lateral direction thereof, as viewed in plan. One rigid member 21 is curved in the opposite direction that in which the other rigid member 22 is curved. Specifically, the curved shape of one rigid member 21 is convex to the left, and the curved shape of the other rigid member 22 is convex to the right, with respect to the middle coupling shaft 23. Accordingly, regarding the shape of each cross unit 20, the interval between the two outer end coupling shafts 24 is larger than that between the two inner end coupling shafts 25, and each extendable arm A, B, C, D has a curved shape that is convex to one side. In the illustrated embodiment, each extendable arm A, B, C, D forming a closed frame has a curved shape that is convex toward the outside of the frame on the same plane.

The coupling mechanism 30 that pivotally couples the ends of adjoining ones of the extendable arms includes first bent members 26, second bent members 27, and bent portion coupling shafts 28. The first and second bent members 26, 27 are members bent in a V-shape. Each bent portion coupling shaft 28 pivotally couples the first bent member 26 and the second bent member 27 at their intersection (the position of their bend points).

Each first bent member 26 pivotally couples the inner end coupling shaft 25 of one of adjoining two of the extendable arms A, B, C, D and the outer end coupling shaft 24 of the other extendable arm. Each second bent member 27 pivotally couples the outer end coupling shaft 24 of the one of adjoining two of the extendable arms A, B, C, D and the inner end coupling shaft 25 of the other extendable arm. The pivoting operation of the first and second bent members 26, 27 and the extending/contracting operation of each extendable arm A, B, C, D are performed on the same plane.

For example, when adjoining two of the middle coupling shafts 23 are electrically or manually moved toward each other from the state shown in FIG. 4, the movement of the middle coupling shafts 23 is transmitted to each extendable arm A, B, C, D, whereby the frame 100 is contracted as shown in FIG. 5. When adjoining two of the middle coupling shafts 23 are electrically or manually moved away from each other, the movement of the middle coupling shafts 23 is transmitted to each extendable arm A, B, C, D, whereby the frame 100 is extended as shown in FIG. 6.

Figure 7:
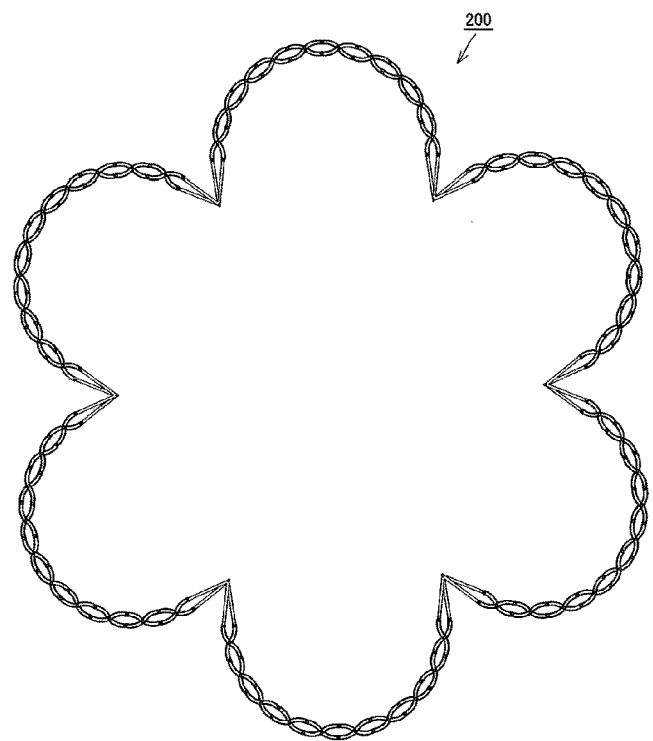
FIG. 7 is a plan view of a variable shape frame according to another embodiment of the present invention.
Figure 8:
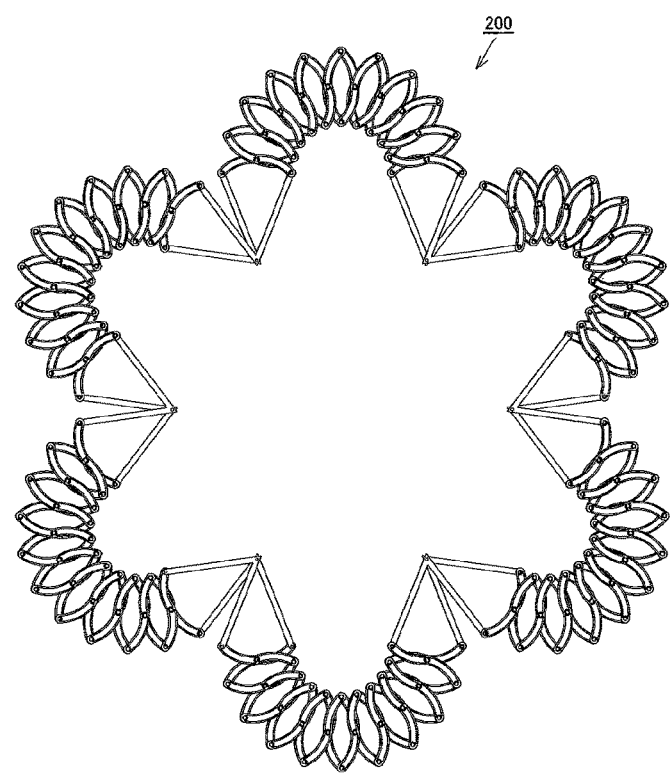
FIG. 8 is a plan view of the variable shape frame of FIG. 7 in a contracted state.

Embodiment Shown in FIGS. 7 and 8

FIGS. 7 and 8 show a variable shape frame 200 according to a second embodiment of the present invention. FIG. 7 shows the variable shape frame 200 in an extended state, and FIG. 8 shows the variable shape frame 200 in a contracted state.

The second embodiment shown in FIGS. 7 and 8 is different from the first embodiment shown in FIGS. 4 to 6 only in that the number of extendable arms is six. The structure of the second embodiment is otherwise substantially the same as the first embodiment.

Figure 9:
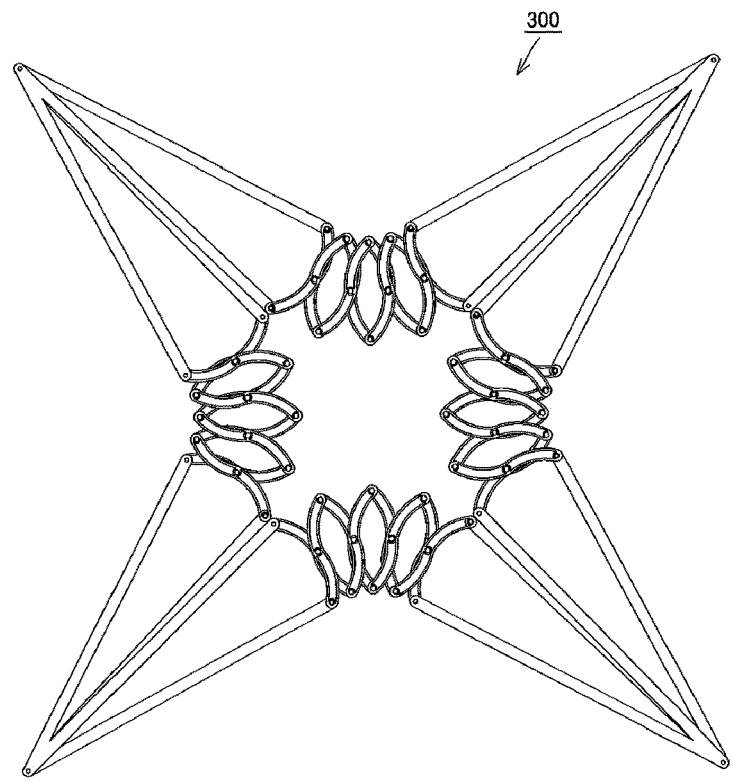
FIG. 9 is a plan view of a variable shape frame according to still another embodiment of the present invention.
Figure 10:
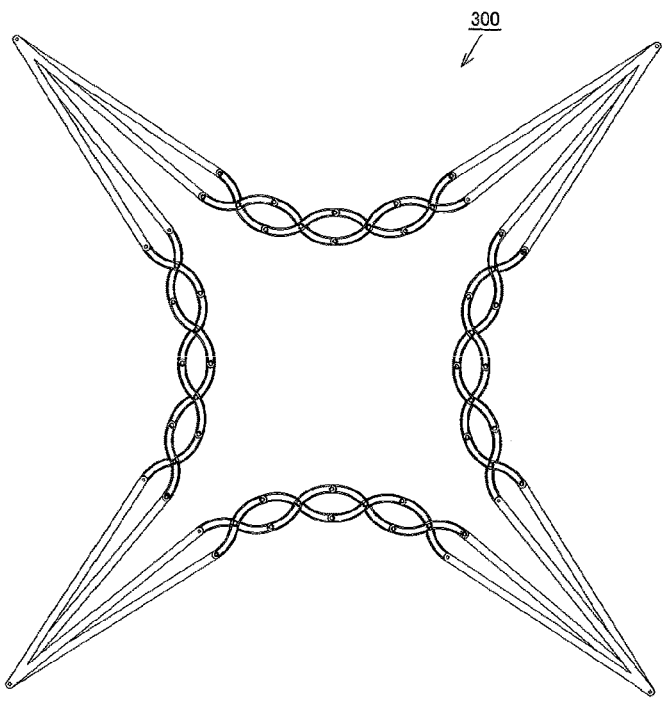
FIG. 10 is a plan view of the variable shape frame of FIG. 9 in an extended state.

Embodiment Shown in FIGS. 9 and 10

FIGS. 9 and 10 show a variable shape frame 300 according to a third embodiment of the present invention. FIG. 9 shows the variable shape frame 300 in a contracted state, and FIG. 10 shows the variable shape frame 300 in an extended state.

The third embodiment shown in FIGS. 9 and 10 is different from the first embodiment shown in FIGS. 4 to 6 only in that each extendable arm has a curved shape that is concave toward the inside of the frame 300 on the same plane when in the extended state. The structure of the third embodiment is otherwise substantially the same as the first embodiment.

Embodiment Shown in FIGS. 11 to 16

Figure 11:
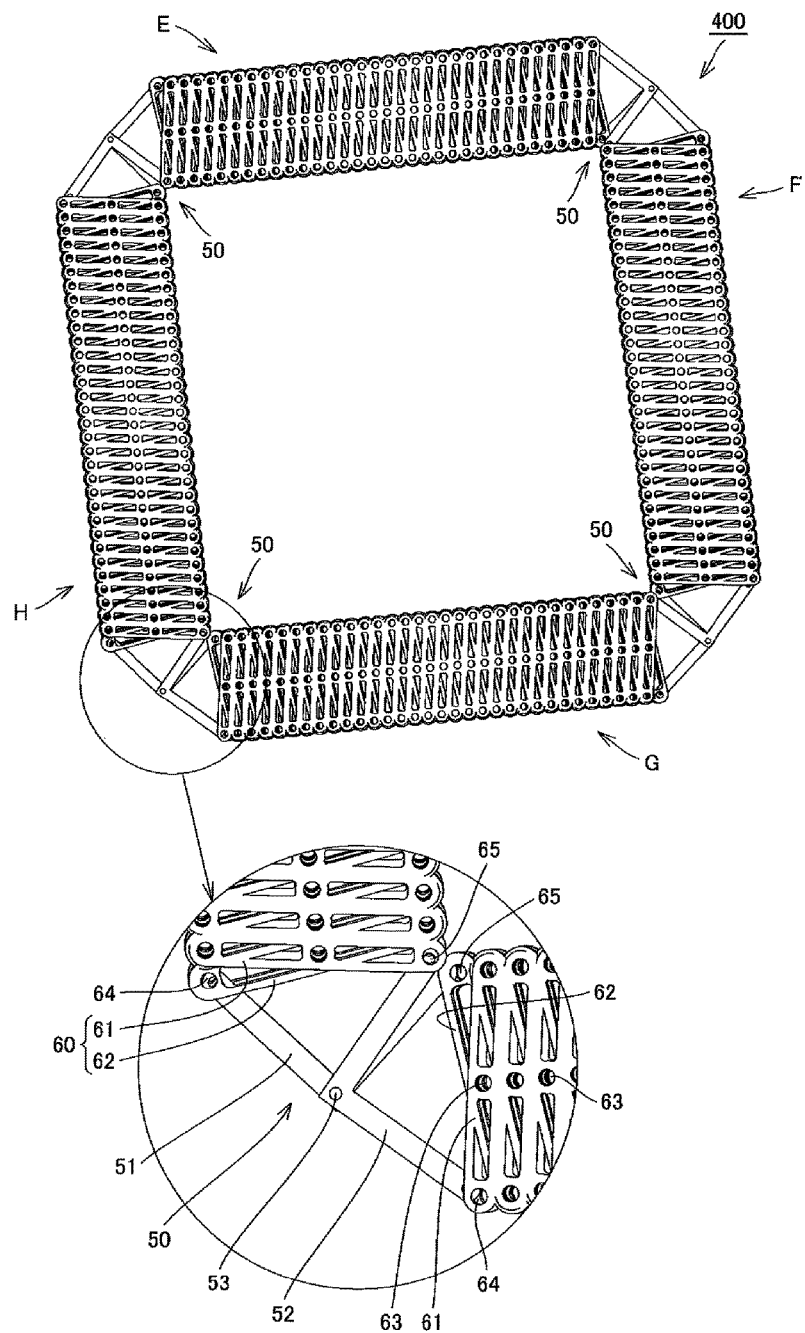
FIG. 11 is a plan view of a variable shape frame according to yet another embodiment of the present invention.
Figure 12:
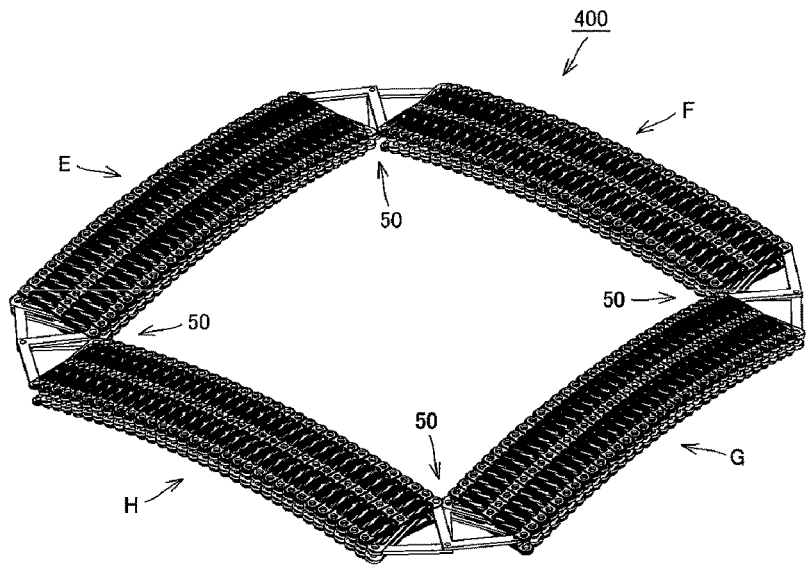
FIG. 12 is a perspective view of the variable shape frame of FIG. 11.
Figure 13:
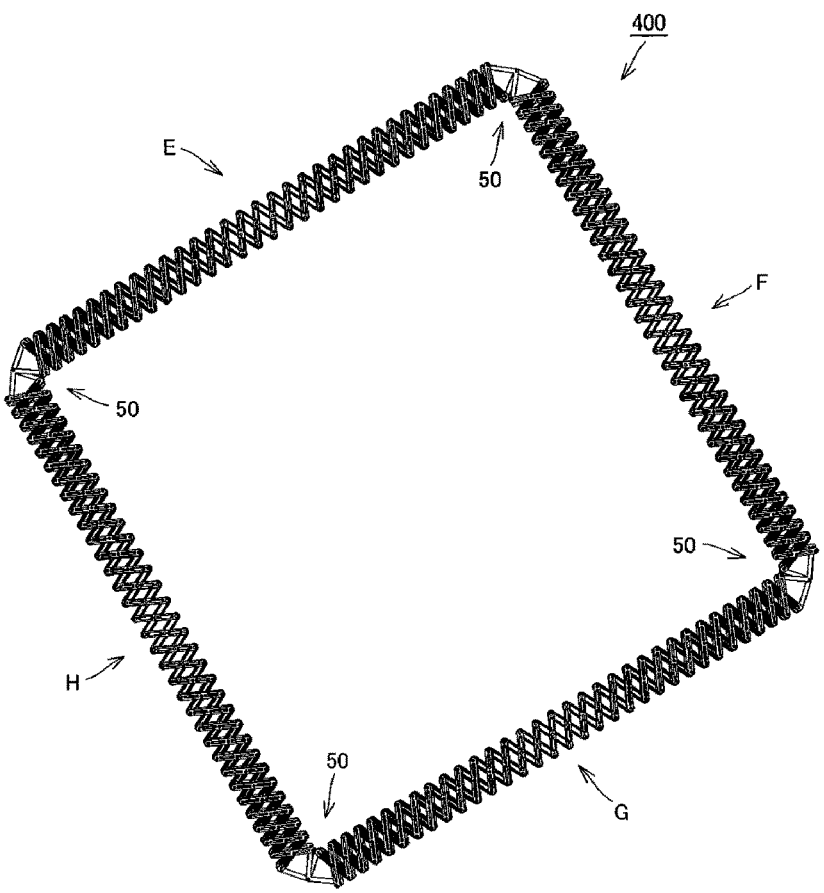
FIG. 13 is a plan view of the variable shape frame of FIG. 11 extended to an intermediate position.
Figure 14:
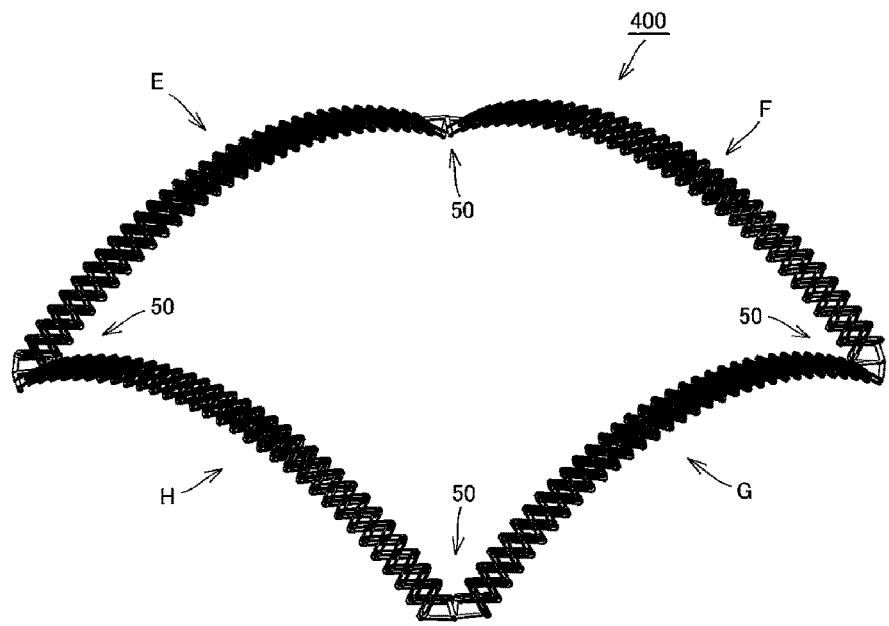
FIG. 14 is a perspective view of the variable shape frame of FIG. 13.
Figure 15:
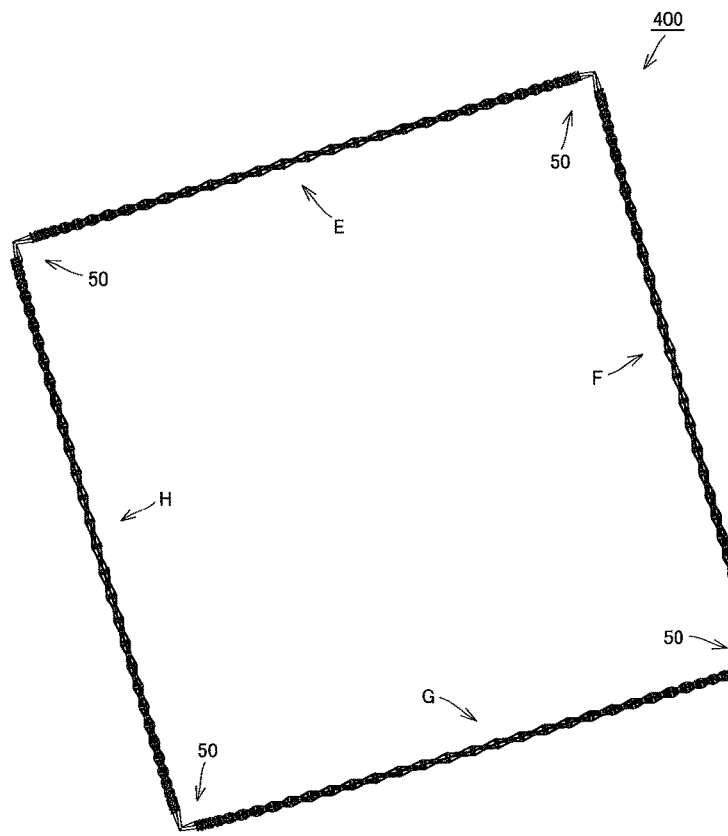
FIG. 15 is a plan view of the variable shape frame of FIG. 11 extended to the maximum.
Figure 16:
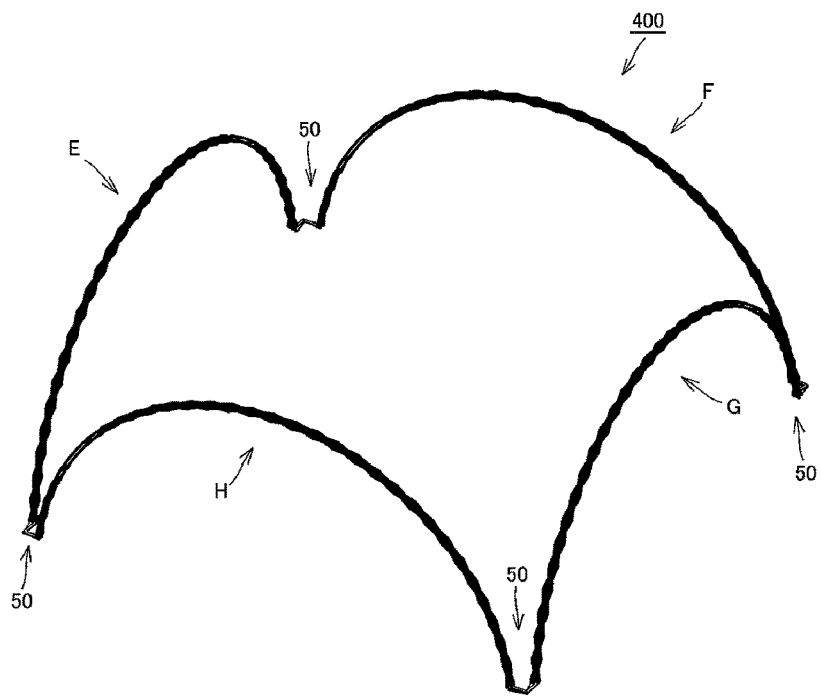
FIG. 16 is a perspective view of the variable shape frame of FIG. 15.

FIGS. 11 to 16 show a variable shape frame 400 according to a fourth embodiment of the present invention. FIGS. 11 and 12 show the variable shape frame 400 in a contracted state, FIGS. 13 and 14 show the variable shape frame 400 extended to an intermediate position, and FIGS. 15 and 16 show the variable shape frame 400 extended to the maximum.

In the present embodiment as well, the variable shape frame 400 includes four arc-shaped extendable arms E, F, G, H and a coupling mechanism 50. The four extendable arms E, F, G, H are arranged to form a closed frame, and the coupling mechanism 50 couples the ends of adjoining ones of the extendable arms E, F, G, H so that the adjoining extendable arms can move together.

Each extendable arm E, F, G, H includes a plurality of cross units 60 and an end coupling portion. Each cross unit 60 is formed by two rigid members 61, 62 crossing each other in an X-shape and pivotally coupled by a middle coupling shaft 63. The end coupling portion pivotally couples the ends of adjoining ones of the cross units 60. The end coupling portion includes outer end coupling shafts 64 located on the outer side of the variable shape frame 400 and inner end coupling shafts 65 located on the inner side of the variable shape frame 400.

Each rigid member 61, 62 has a shape curved in the thickness direction thereof so that the extendable arm E, F, G, H extends and contracts along a track curved in the thickness direction of the rigid members 61, 62. Such a rigid member is described in Japanese Unexamined Patent Application Publication No. 2014-159070 filed by the applicant of the present application.

Specifically, each rigid member 61, 62 is curved in the thickness direction thereof, and both end coupling points (points through which the outer end coupling shafts 64 extend and points through which the inner end coupling shafts 65 extend) are located at the positions shifted to one side in the thickness direction with respect to a longitudinal axis extending linearly in the longitudinal direction through middle coupling points (points through which the middle coupling shafts 63 extend).

The coupling mechanism 50 that couples adjoining two of the extendable arms E, F, G, H curved in the thickness direction so that these two extendable arms can move together includes a first bent member 51, a second bent member 52, and a bent portion coupling shaft 53 at each corner of the variable shape frame 400. Each first bent member 51 pivotally couples the inner end coupling shaft 65 of one of adjoining two of the extendable arms E, F, G, H and the outer end coupling shaft 64 of the other extendable arm. Each second bent member 52 pivotally couples the outer end coupling shaft 64 of the one of adjoining two of the extendable arms E, F, G, H and the inner end coupling shaft 65 of the other extendable arm.

In the embodiment shown in FIGS. 11 to 16, the first and second bent members 51, 52 pivot on the same plane, and each extendable arm E, F, G, H extends and contracts along a curved track on a plane perpendicular to the same plane.

In FIGS. 11 and 12, the extendable arms E, F, G, H are in a contracted state. The extent to which each extendable arm E, F, G, H is curved is the smallest in this state. In FIGS. 13 and 14, the extendable arms E, F, G, H have been extended to an intermediate position. In this state, the extent to which each extendable arm E, F, G, H is curved is somewhat larger than in the state shown in FIGS. 11 and 12. In FIGS. 15 and 16, the extendable arms E, F, G, H have been extended to the maximum. The extent to which each extendable arm E, F, G, H is curved is the largest in this state.

Figure 17:
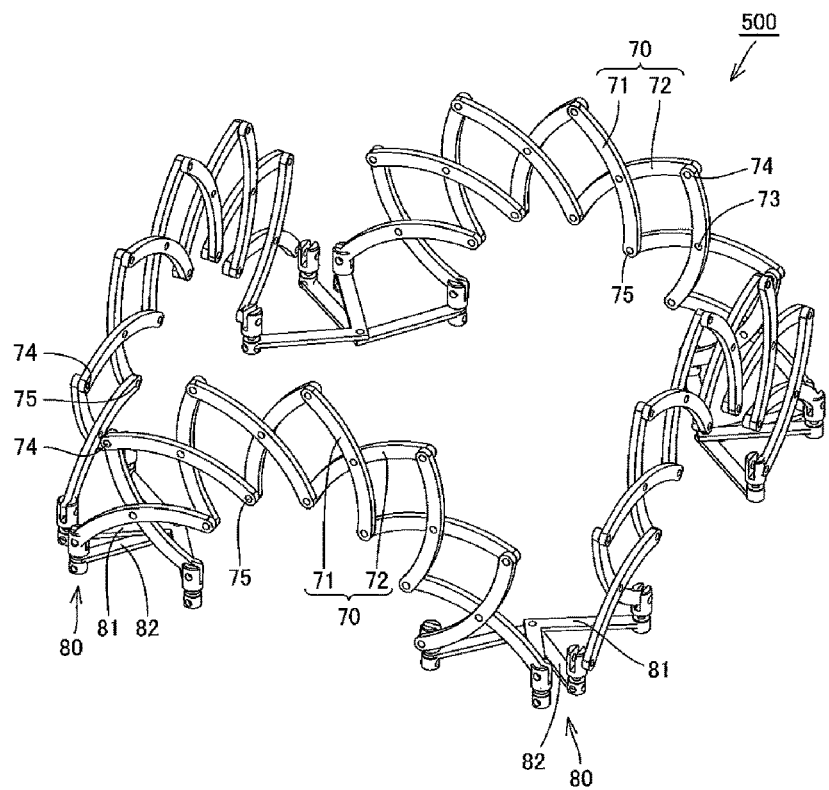
FIG. 17 is a perspective view of a variable shape frame according to a further embodiment of the present invention.
Figure 18:
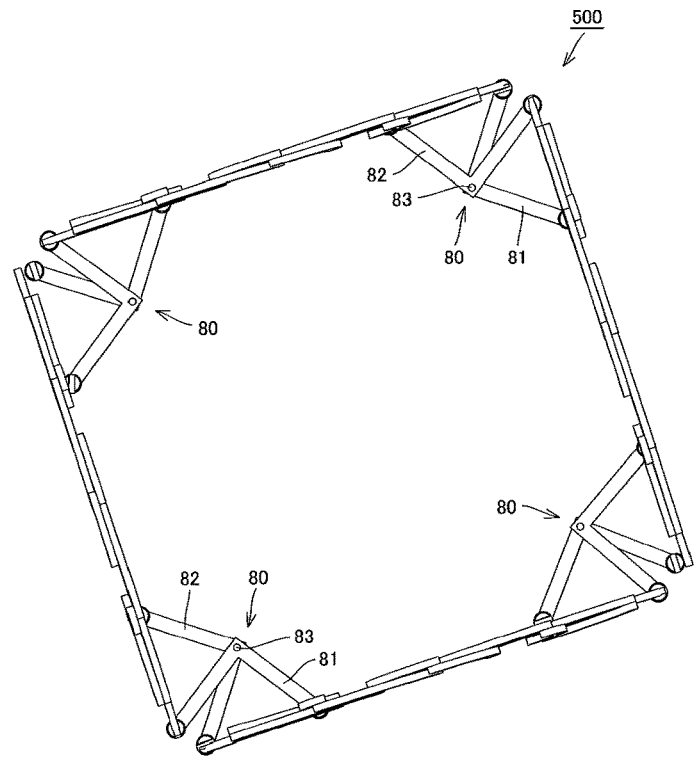
FIG. 18 is a plan view of the variable shape frame of FIG. 17.
Figure 19:
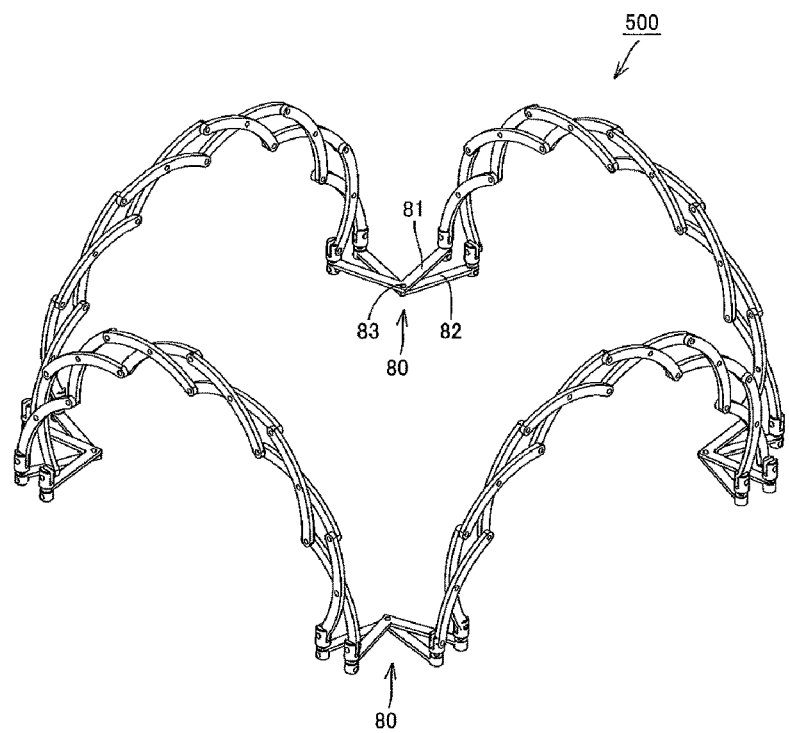
FIG. 19 is a perspective view of the variable shape frame of FIG. 17 in an extended state.

Embodiment Shown in FIGS. 17 to 19

FIGS. 17 to 19 show a variable shape frame 500 according to a fifth embodiment of the present invention. FIGS. 17 and 18 show the variable shape frame 500 in a contracted state, and FIG. 19 shows the variable shape frame 500 in an extended state.

In the present embodiment as well, the variable shape frame 500 includes four arc-shaped extendable arms and a coupling mechanism 80. The four extendable arms are arranged to form a closed frame, and the coupling mechanism 80 couples the ends of adjoining ones of the arc-shaped extendable arms so that the adjoining extendable arms can move together.

Each extendable arm includes a plurality of cross units 70 and an end coupling portion. Each cross unit 70 is formed by two rigid members 71, 72 crossing each other in an X-shape and pivotally coupled by a middle coupling shaft 73. The end coupling portion pivotally couples the ends of adjoining ones of the cross units 70. The end coupling portion includes inner end coupling shafts 75 located on the inner side of the variable shape frame 500 and outer end coupling shafts 74 located on the outer side of the variable shape frame 500.

As shown in the figures, each rigid member 71, 72 has a shape curved in the lateral direction thereof. One rigid member 71 is curved in the opposite direction that in which the other rigid member 72 is curved. Each extendable arm formed by connecting the cross units 70 each including the rigid members 71, 72 has a curved shape that is convex upward. In the illustrated embodiment, the curved shape of each extendable arm is a semicircular shape.

The coupling mechanism 80 that couples adjoining ones of the extendable arms so that these two extendable arms can move together includes first bent members 81, second bent members 82, and bent portion coupling shafts 83. Each first bent member 81 pivotally couples the inner end coupling shaft 75 of one of adjoining two of the extendable arms and the outer end coupling shaft 74 of the other extendable arm. Each second bent member 82 pivotally couples the outer end coupling shaft 74 of the one of adjoining two of the extendable arms and the inner end coupling shaft 75 of the other extendable arm.

The first and second bent members 81, 82 pivot on a single plane (e.g., a horizontal plane), and each extendable arm extends and contracts along a curved track on a plane perpendicular to this plane (e.g., a vertical plane).

Figure 20:
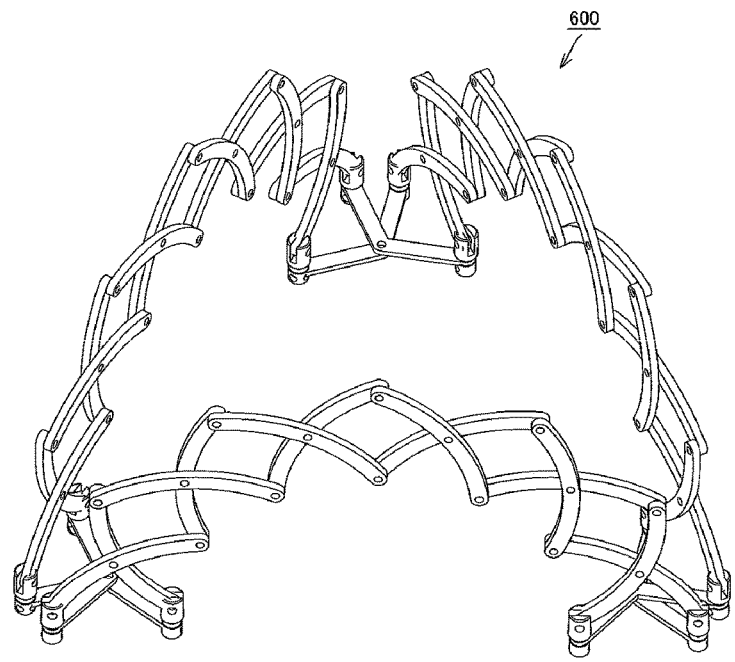
FIG. 20 is a perspective view of a variable shape frame according to a still further embodiment of the present invention.
Figure 21:
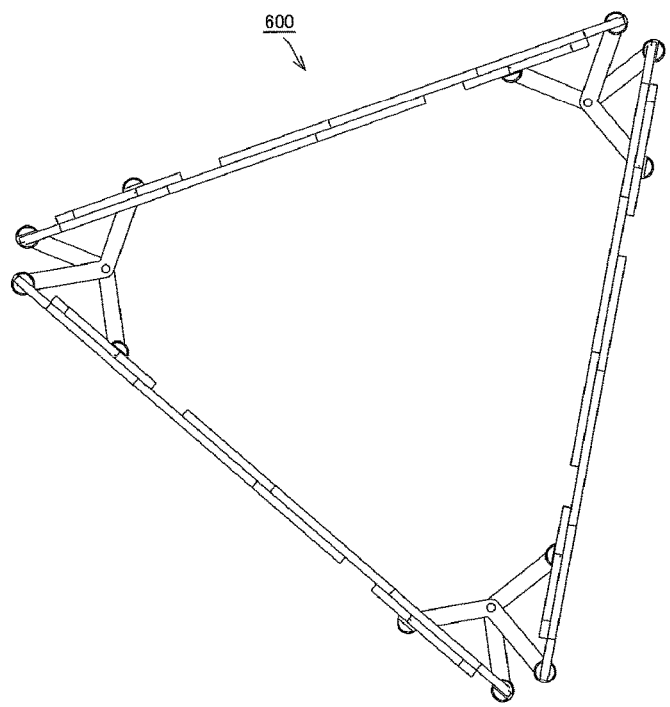
FIG. 21 is a plan view of the variable shape frame of FIG. 20.
Figure 22:
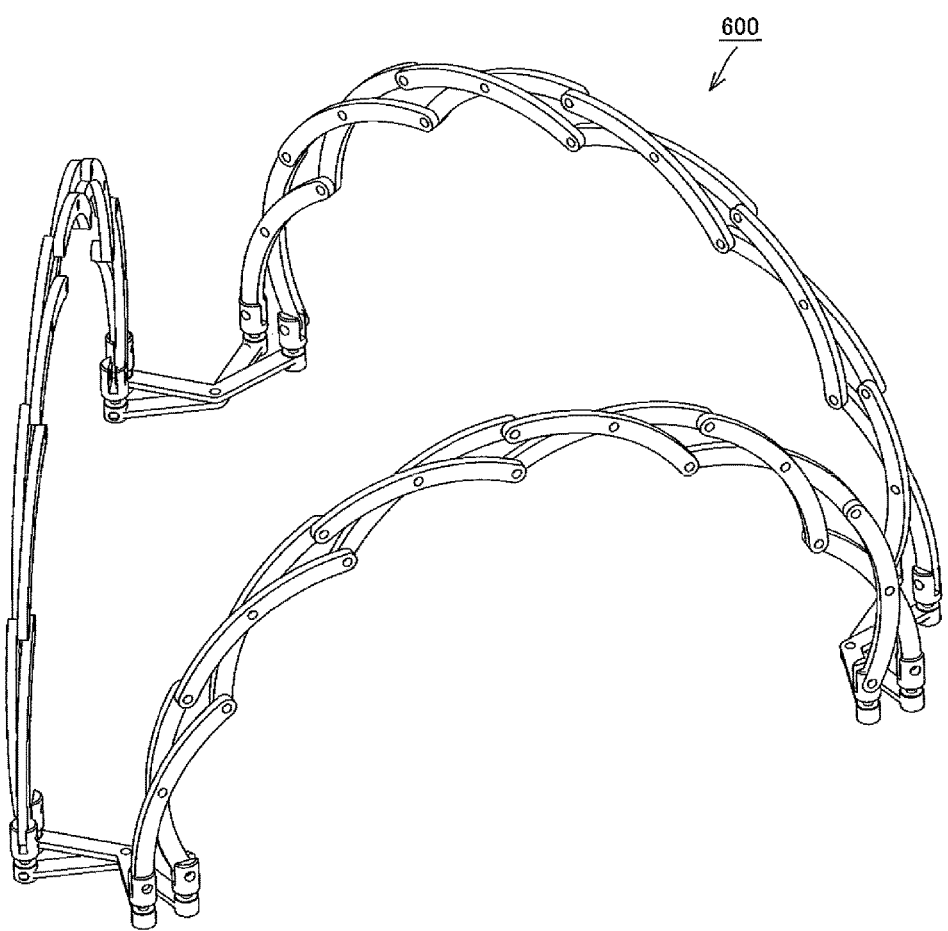
FIG. 22 is a perspective view of the variable shape frame of FIG. 20 in an extended state.

Embodiment Shown in FIGS. 20 to 22

FIGS. 20 to 22 show a variable shape frame 600 according to a sixth embodiment of the present invention. FIGS. 20 and 21 show the variable shape frame 600 in a contracted state and FIG. 22 shows the variable shape frame 600 in an extended state. The sixth embodiment is different from the fifth embodiment shown in FIGS. 17 to 19 only in that the number of extendable arms is three, and the structure of the sixth embodiment is otherwise substantially the same as that of the fifth embodiment.

Figure 23:
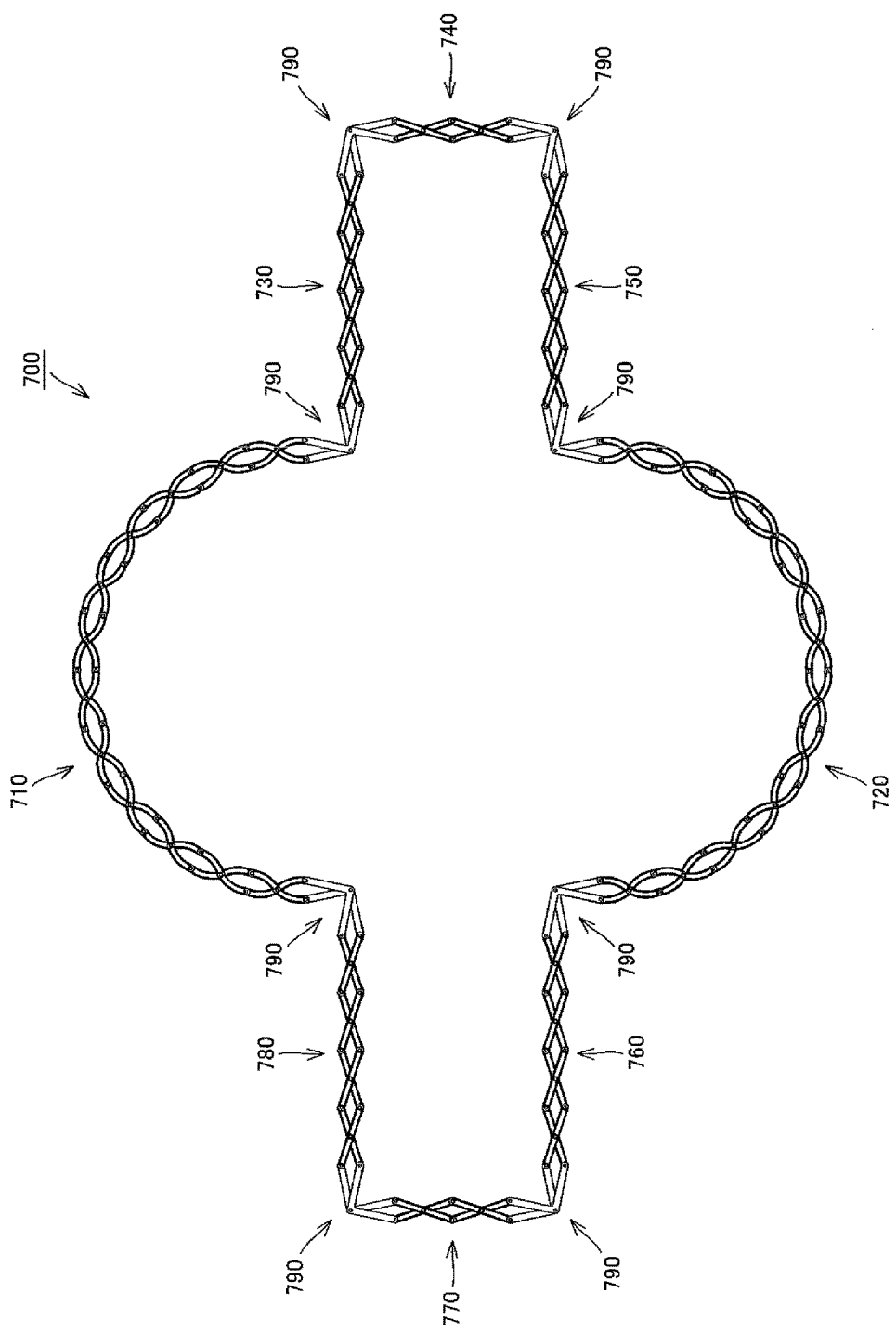
FIG. 23 is a plan view of a variable shape frame according to a yet further embodiment of the present invention.
Figure 24:
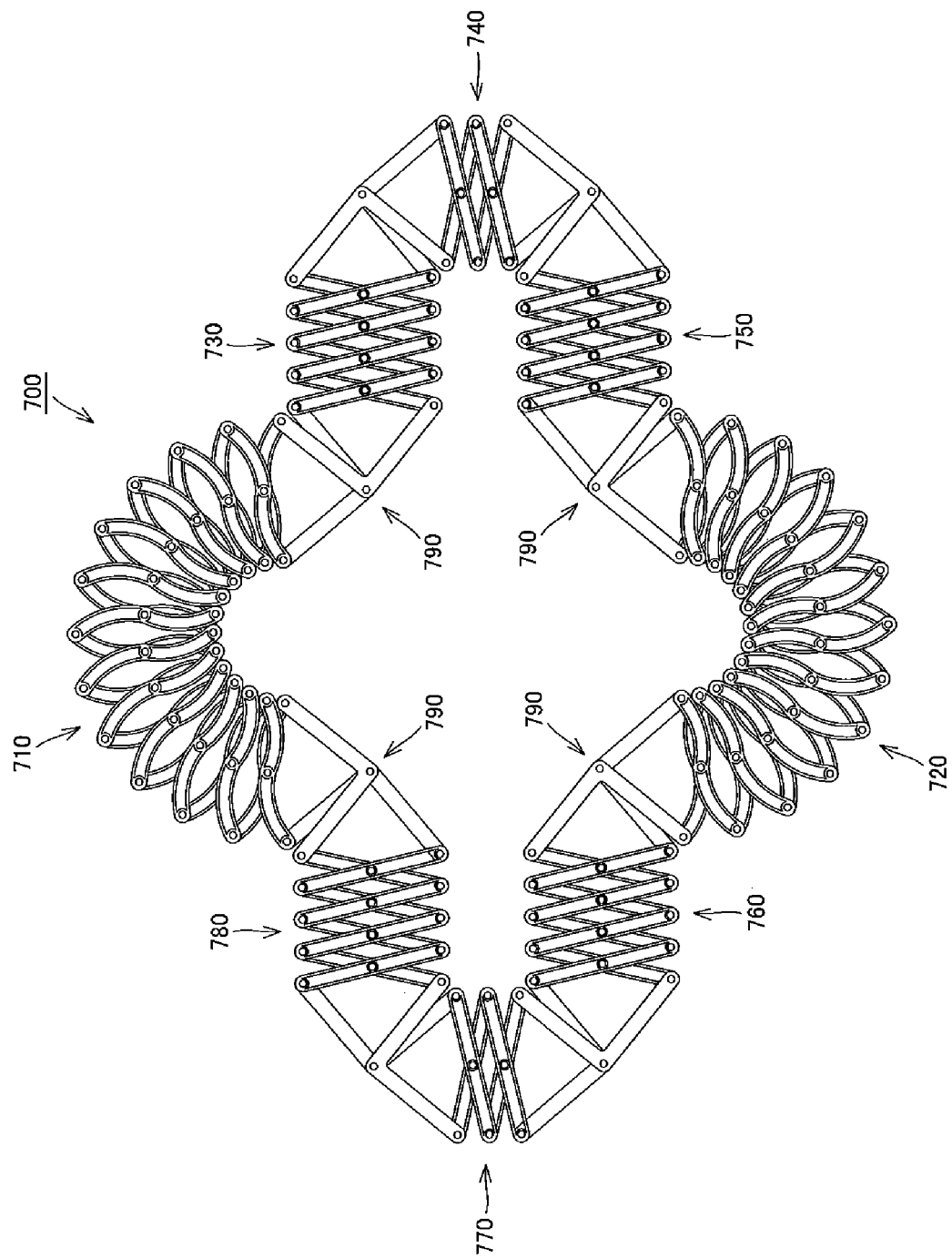
FIG. 24 is a plan view of the variable shape frame of FIG. 23 in a contracted state.

Embodiment Shown in FIGS. 23 and 24

FIGS. 23 and 24 show a variable shape frame 700 according to a seventh embodiment of the present invention. FIG. 23 shows the variable shape frame 700 in an extended state and FIG. 24 shows the variable shape frame 700 in a contracted state.

The variable shape frame 700 shown in the figures includes a plurality of extendable arms 710, 720, 730, 740, 750, 760, 770, 780 and a coupling mechanism 790. The plurality of extendable arms 710, 720, 730, 740, 750, 760, 770, 780 are arranged to form a frame, and the coupling mechanism 790 couples the ends of adjoining ones of the extendable arms 710, 720, 730, 740, 750, 760, 770, 780 so that the adjoining extendable arms can move together.

As in the embodiments described above, each extendable arm 710, 720, 730, 740, 750, 760, 770, 780 includes a plurality of cross units and an end coupling portion. Each cross unit is formed by two rigid members crossing each other in an X-shape and pivotally coupled by a middle coupling shaft. The end coupling portion pivotally couples the ends of adjoining ones of the cross units. The end coupling portion includes inner end coupling shafts located on the inner side of the variable shape frame 700 and outer end coupling shafts located on the outer side of the variable shape frame 700.

The variable shape frame 700 of the seventh embodiment is different from each embodiment described above in that the extendable arms include curved extendable arms 710, 720 and linear extendable arms 730, 740, 750, 760, 770, 780. The curved extendable arms 710, 720 extend and contract along a curved track, and the linear extendable arms 730, 740, 750, 760, 770, 780 extend and contract along a linear track.

As in the embodiment described above, the coupling mechanism 790 includes first bent members, second bent members, and bent portion coupling shafts. Each first bent member pivotally couples the inner end coupling shaft of one of adjoining two of the extendable arms and the outer end coupling shaft of the other extendable arm. Each second bent member pivotally couples the outer end coupling shaft of the one of adjoining two of the extendable arms and the inner end coupling shaft of the other extendable arm. Each bent portion coupling shaft pivotally couples the first bent member and the second bent member at their intersection.

Although some embodiments of the present invention are described above with reference to the drawings, the present invention is not limited to the illustrated embodiments. Various modifications or variations can be made to the illustrated embodiments without departing from the spirit and scope of the present invention.

The variable shape frame can be advantageously used in many applications such as a part of architectural structures, a part of containers, exhibits, a part of pavilions, play equipment, assembling toys, learning materials, decorations, art objects, a part of furniture, a part of beds of vehicles, a part of lighting devices, a part of enclosures for animals such as pets, a part of steps, a part of robot bodies, a part of fish tanks, a part of pools, a part of bathroom stalls, a part of dressing stalls, a part of shower stalls, a part of aboveground buildings, a part of underground buildings, a part of underwater buildings, a part of aerial buildings, a part of simple apartments (e.g., for stricken areas), a part of warehouses, a part of vegetable factories, a part of tent structures, and a part of facilities such as zoo and botanical gardens.

The variable shape frame is also applicable to the fashion industry etc. For example, the variable shape frame is applicable to accessories, costumes, headwear, etc. whose shape, pattern, design, etc. can be changed.

The invention claimed is:

1. A variable shape frame, comprising:
a plurality of extendable arms arranged to form a frame; and
a coupling mechanism that couples ends of adjoining ones of said extendable arms so that said adjoining extendable arms can move together,
wherein
each of said extendable arms includes a plurality of cross units each formed by two rigid members crossing each other in an X-shape and pivotally coupled by a middle coupling shaft, and an end coupling portion pivotally coupling ends of adjoining ones of said cross units,
said end coupling portion includes inner end coupling shafts located on an inner side, and outer end coupling shafts located on an outer side,
each of said rigid members has a curved shape so that said extendable arm extends and contracts along a curved track, and
said coupling mechanism includes:
first bent members each pivotally coupling said inner end coupling shaft of one of adjoining two of said extendable arms and said outer end coupling shaft of the other extendable arm, the first bent members being V-shaped and having a bend point at a mid-point of the V-shape;
second bent members each pivotally coupling said outer end coupling shaft of said one of adjoining two of said extendable arms and said inner end coupling shaft of the other extendable arm, the second bent members being V-shaped and having a bend point at a mid-point of the V-shape; and bent portion coupling shafts each pivotally coupling said first bent member and said second bent member at an intersection of said first and second bent members, the intersection of said first and second bent members being at the bend points of coupled first and second bent members.

2. The variable shape frame according to claim 1, wherein each of said rigid members has a shape curved in a lateral direction thereof, each of said extendable arms has a curved shape that is convex toward an outside of said frame on a same plane when in an extended state, and said first and second bent members operate on said same plane.

3. The variable shape frame according to claim 1, wherein each of said rigid members has a shape curved in a lateral direction thereof, each of said extendable arms has a curved shape that is concave toward an inside of said frame on a same plane when in an extended state, and said first and second bent members operate on said same plane.

4. The variable shape frame according to claim 1, wherein said first and second bent members operate on a same plane, each of said rigid members has a shape curved in a thickness direction thereof, and each of said extendable arms has a shape curved on a plane crossing said same plane when in an extended state.

5. The variable shape frame according to claim 1, wherein said first and second bent members operate on a same plane, each of said rigid members has a shape curved in a lateral direction thereof, and each of said extendable arms has a shape curved on a plane crossing said same plane when in an extended state.

6. A variable shape frame, comprising:

a plurality of extendable arms arranged to form a frame; and a coupling mechanism that couples ends of adjoining ones of said extendable arms so that said adjoining extendable arms can move together, wherein each of said extendable arms includes a plurality of cross units each formed by two rigid members crossing each other in an X-shape and pivotally coupled by a middle coupling shaft, and an end coupling portion pivotally coupling ends of adjoining ones of said cross units, said end coupling portion includes inner end coupling shafts located on an inner side, and outer end coupling shafts located on an outer side, said extendable arms include a curved extendable arm that extends and contracts along a curved track and a linear extendable arm that extends and contracts along a linear track, and said coupling mechanism includes:

first bent members each pivotally coupling said inner end coupling shaft of one of adjoining two of said extendable arms and said outer end coupling shaft of the other extendable arm, the first bent members being V-shaped and having a bend point at a mid-point of the V-shape;

second bent members each pivotally coupling said outer end coupling shaft of said one of adjoining two of said extendable arms and said inner end coupling shaft of the other extendable arm, the second bent members being V-shaped and having a bend point at a mid-point of the V-shape; and bent portion coupling shafts each pivotally coupling said first bent member and said second bent member at an intersection of said first and second bent members, the intersection of said first and second bent members being at the bend points of coupled first and second bent members.

* * * * *